United States Patent [19]

Le Parquier et al.

[11] Patent Number: 5,195,144
[45] Date of Patent: Mar. 16, 1993

[54] PROCESS FOR ESTIMATING THE DISTANCE BETWEEN A STATIONARY OBJECT AND A MOVING VEHICLE AND DEVICE FOR USING THIS PROCESS

[75] Inventors: Guy Le Parquier, Versailles; Henri Fousse, Nogent sur Marne, both of France

[73] Assignee: Thomson-CSF, Puteaux, France

[21] Appl. No.: 832,629

[22] Filed: Feb. 12, 1992

Related U.S. Application Data

[63] Continuation of Ser. No. 724,481, Jun. 28, 1991, abandoned, which is a continuation of Ser. No. 435,982, Nov. 13, 1989, abandoned.

[30] Foreign Application Priority Data

Nov. 15, 1988 [FR] France .................................. 88 14804

[51] Int. Cl.[5] .......................... G06K 9/00; G01C 3/00
[52] U.S. Cl. ........................................ 382/1; 356/3; 358/107; 364/458
[58] Field of Search ................ 382/1; 364/458, 459; 358/107; 356/3, 4, 27, 28

[56] References Cited

U.S. PATENT DOCUMENTS 4,746,790  5/1988  Sorimachi ............................. 356/4
4,799,267 12/1989  Kamejima et al. .................... 382/1

FOREIGN PATENT DOCUMENTS

0005918 12/1979 European Pat. Off. .
2018084 10/1979 United Kingdom .

Primary Examiner—Leo H. Boudreau
Assistant Examiner—Christopher Kelley
Attorney, Agent, or Firm—Oblon, Spivak, McClelland, Maier & Neustadt

[57] ABSTRACT

A process for estimating the distance between a stationary object and a vehicle by providing the processing of images from the speed of enlargement of an image of an object seen from a vehicle. Images of the object are analyzed by an image speed sensor mounted on a vehicle and these images are centered relative to the speed vector of the vehicle. The luminance values of the pixels of the images successively analyzed by the sensor and the luminance value of pixels of a series of predicted images are integrated in a plurality of image memories corresponding respectively to a plurality of predetermined values for the distance. The luminance value of each pixel of a predicted image is determined as a function of the integrated luminance value for a pixel being considered, as a function of the speed of the vehicle, as a function of the position of the pixel in the predicted image and as a function of the distance value corresponding to the particular memory being considered. As a result the predicted image is affected by an increasing enlargement of the image of the object as a function of time.

5 Claims, 8 Drawing Sheets

PROCESS FOR ESTIMATING THE DISTANCE BETWEEN A STATIONARY OBJECT AND A MOVING VEHICLE AND DEVICE FOR USING THIS PROCESS

This application is a continuation of application Ser. No. 07/724,481, filed on Jun. 28, 1991, now abandoned, which is a continuation of application Ser. No. 07/435,982 filed Nov. 13, 1989, now abandoned.

BACKGROUND OF THE INVENTION

1. Field of the Invention

The invention relates to a process for estimating the distance between a stationary object, for example the ground, and a moving vehicle, for example an aircraft, by using a series of images analyzed by a sensor mounted on the vehicle. If these images are centered in the direction of movement of the vehicle, any object grows from one image to the next, as the vehicle approaches the object, then disappears by leaving the image when the vehicle passes from the vicinity of the object. The size of the image of the object and its position in the analyzed image vary continuously as a function of the distance of the vehicle from the object.

2. Discussion of Background

Known processes make it possible to estimate the distance between a stationary object and a vehicle on which an image sensor is mounted. These known processes have the common characteristic of using a spatial differentiation of images to show the contours of objects. The movement of the contours then makes it possible to evaluate the speed of the various objects present in the image. The speed field thus determined makes it possible to estimate the distance to the vehicle.

The known processes are very sensitive to noise because they use an image spatial differentiation to show the contours of the objects, with a subsequent differential processing to show the movements of the contours. These two successive differentiations favor high spatial and time frequencies so that the signal-to-noise ratio is greatly affected. They are therefore particularly ill-suited for very noisy images such as images provided by an infrared camera. Furthermore, the image spatial differentiation of the prior art has difficulty finding contours which consists of fine transitions. Finally, the determination of contours in each image requires many calculations, which are difficult to perform in real time.

SUMMARY OF THE INVENTION

The object of the invention is to eliminate these drawbacks by providing a process using an integration of the series of images analyzed by the sensor which virtually enlarges these images according to various enlargement laws as a function of time instead of by differentiation. This integration makes it possible to filter the noise thus making it relatively insensitive to noise.

The present invention is a method and an apparatus for estimating the distance between a stationary object and a moving vehicle using an integration procedure whereby a series of analyzed images from a single sensor are used to provide for predicted enlargement of images according to various enlargement laws as a function of time. Integration allows for filtering of the noise so that the entire process is insensitive to noise. The present invention utilizes successive luminance values of each pixel measured by an image sensor which are integrated and stored in a memory. The present invention provides for a calculation of the luminance values of a predicted image from a hypothetical law providing distance D(t) as a function of time. A plurality of predicted images are calculated for a plurality of time laws. These predicted images from each time law are integrated into an image memory at the same time as a series of images analyzed by the sensor.

Each time law of variation is provided by a known equation and associated with each hypothetical value of distance in a correlator. The time laws which are a part of respective correlators assume an initial distance and provides an initialization at a different instant. The plurality of correlators each have different initializations. The plurality of image memories corresponding to the plurality of predetermined values for distance are integrated with the luminance values of pixels of images which are successively analyzed by the sensor and also integrated with the luminance values of pixels of a series of predicted images in order to provide integrated luminance values for pixels of each of the image memories. This luminance value for each pixel depends on the speed of the vehicle and the position of a particular pixel being considered as well as the predetermined distance values of a particular corresponding image memory. Subsequently, a search is conducted among the plurality of contrasts exhibited by the integrated luminance value from the plurality of memories in order to find which one of the memories has an integrated luminance value exhibiting the greatest contrast which corresponds to a sharply focused image of the particular object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
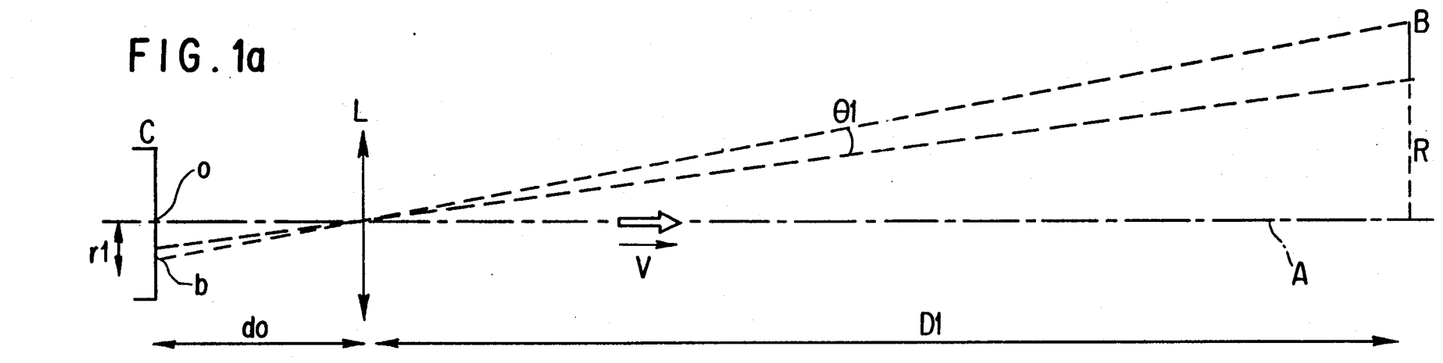
FIGS. 1A and 1B are optical diagrams illustrating the optical phenomenon used in the process according to the invention.
Figure 1B:
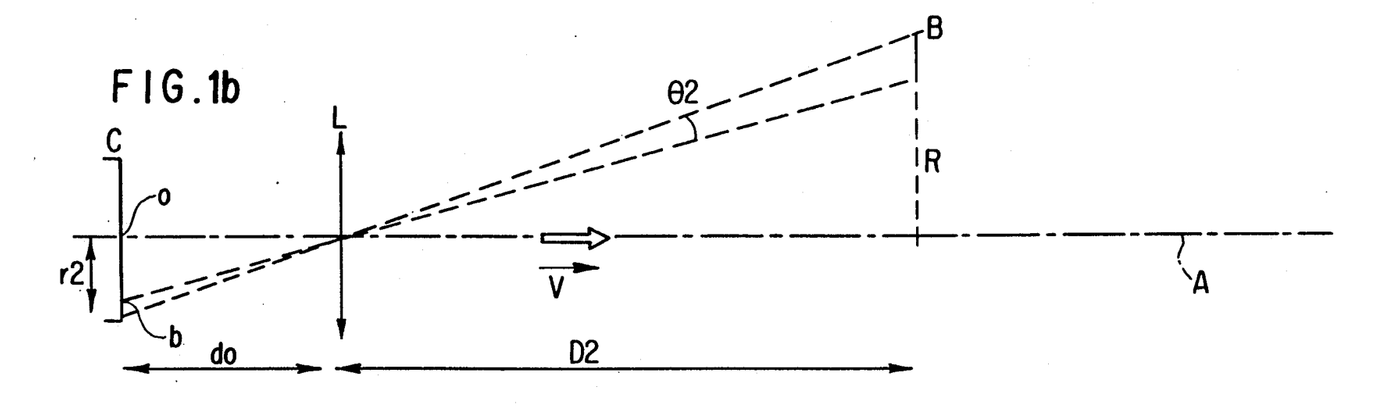

Referring now to the drawings, wherein like reference numerals designate identical or corresponding parts throughout the several views, and more particularly to FIG. 1 thereof, FIG. 1 illustrates the functioning of an image sensor C when the vehicle supporting this image sensor is moving with a constant speed V in a direction which is close to but distinguishable from the direction of an object B. An optical system L forms image b of the object in the plane of sensor C. Distance d0 between optical system L and sensor C is stationary.

Optical axis A of the image sensor is assumed aligned on speed vector V. In practice, center o of the image an be stabilized in the direction of the speed vector V by a known type of image resetting device, controlled by an inertial device also of known type. Axis A of the image sensor cannot then be confused with the axis of the speed of the vehicle, because the luminance value of each pixel of the image is recalculated to obtain an image equivalent to that obtained when sensor C is centered in the direction of vector V.

When object B is at a distance D1 from the vehicle, it is seen at an angle $\theta 1$ and its image b is located at distance r1 from center o of the sensor, i.e., from the center of the image. After a certain time, the vehicle having moved in a straight line, object B is at a distance D2, less than D1. Object B remains at a distance R that is constant relative to axis A. Object B is then seen at an angle $\theta 2$ greater than $\theta 1$. Its image b is then located at a distance r2 from center o of the sensor, r2 being greater than r1, and the size of the image b being greater than what it had previously.

$$\frac{r(t)}{d0} = \frac{R}{D(t)} \quad (1)$$

It is shown that distance r(t) between center o of the image analyzed by the sensor and the center of image b of the object varies with a speed proportional to distance r(t) and to the logarithmic derivative of distance D(t) between the vehicle and object B.

$$\frac{dr}{dt} = \frac{r(t)}{D(t)} \times \frac{dD(t)}{dt} = \frac{r(t)}{D(t)} \cdot V \quad (2)$$

On the other hand, it is shown that the size of image b of the object is inversely proportional to distance D(t).

Figure 2:
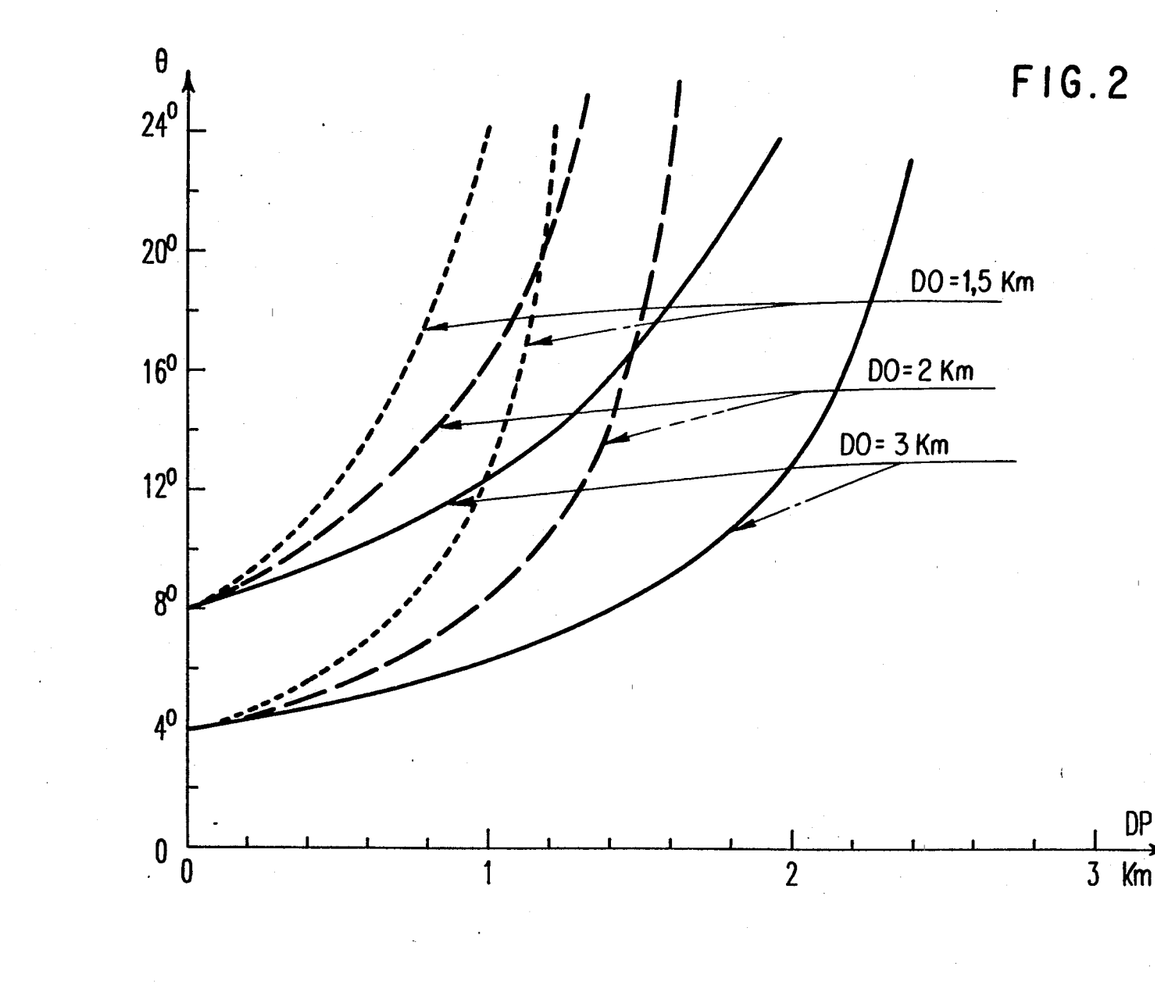
FIG. 2 represents examples of graphs of the angle at which the sensor sees an object, from a moving vehicle, as a function of the distance traveled by the vehicle in the direction of the object.

FIG. 2 represents examples of graphs of angle $\theta$ at which the sensor sees an object, when the vehicle moves, as a function of distance DP traveled by the vehicle. The value of $\theta$ determines the size of image b of the object. A first object is seen at an angle of 4° at the initial instant corresponding to a zero traveled distance. A second object is seen at an angle of 8° at the initial instant. For each of these objects, three graphs show, respectively, the variation of angle $\theta$ for a value of initial distance D0=1.5 km, then 2 km, then 3 km. It appears that for the same object, for example that seen at an angle of 4° initially, the three graphs separate very sharply as the vehicle approaches the object. This separation of graphs makes it possible to think that it is possible to estimate initial distance D0, and subsequently the distance at each instant, from the evolution of the graph of observed angle $\theta$. It should be noted that distance r(t) between center o of the image and the center of image b of the object varies according to graph similar to those represented in FIG. 2.

Assuming that the images successively analyzed by sensor C are integrated in a memory by accumulating the successive luminance values of each pixel respectively in the case of the memory, and assuming that this memory is constantly reread to display on a screen an image resulting from this integration. This resulting imaging would comprise a blurry zone around image b of the object, since there would not be any exact superposition of the different images b of the object.

Now, assuming that distance D(t) is known at each instant and that optical system L with fixed focus objective is replaced with a zoom lens whose focal distance is controlled as a function of distance D(t) to keep the size and position of image b of the object constant then, in that instance, the integrated image would appear perfectly sharp since there would be a perfect superposition of the series of images analyzed by the sensor. The image would therefore be perfectly sharp if, and only if, the focal distance of the zoom lens were perfectly controlled by distance D(t) between the vehicle and the object. This distance D(t) varies according to a very simple linear time law which can be expressed as a function of distance DO at an initial instant and as a function of modulus V of the speed of the vehicle, a speed which is assumed constant and perfectly known:

$$D(t) = D0 - Vt \quad (3)$$

If, contrary to the preceding assumption, the problem is to determine distance D(t) at each instant, it is possible to use a plurality of sensors, a plurality of zoom lenses, and a plurality of servo devices regulating the focal distance of the zoom lenses according to a plurality of the time laws, corresponding respectively to a plurality of values of initial distance for the same known speed V. The series of images analyzed by each of the sensors is assumed integrated in a memory and displayed on a screen. Of the plurality of images thus obtained on the screens, there is only one that is perfectly sharp. It is the one which corresponds to the servo law that predicts, at each instant, a distance value equal to real distance D(t).

The above discussion makes it possible to better understand the process according to the invention because it uses a plurality of time laws of which only one gives the real value of distance D(t) at each instant. It does not consist in making the focal distance of a zoom lens vary but it consists in calculating the luminance values of a predicted image from a hypothetical law giving distance D(t) as a function of time. A plurality of predicted images are calculated respectively for a plurality of time laws. The series of images predicted by each time law is integrated into an image memory at the same time as the series of images analyzed by the sensor. In a memory corresponding to the exact time law, the integrated luminance values will then have maximum contrast, because the integrated image is sharp. On the other hand, in the memories corresponding to inexact time laws, integrated luminance values have a weaker contrast corresponding to an integrated image which is blurry because of the superposition of predicted images in which position and size of the image of the object are not exactly equal to the position and size of the object in the images analyzed. Of course, since the size of the object and its position vary in time, it is necessary to perform an integration with a leakage, to reduce the weight of luminance values of the oldest images relative to the most recent images.

The estimate of the value of distance D(t), at each instant, then consists in continuously seeking, among the memories those where the integrated luminance values exhibit the greatest contrast.

Figure 3:
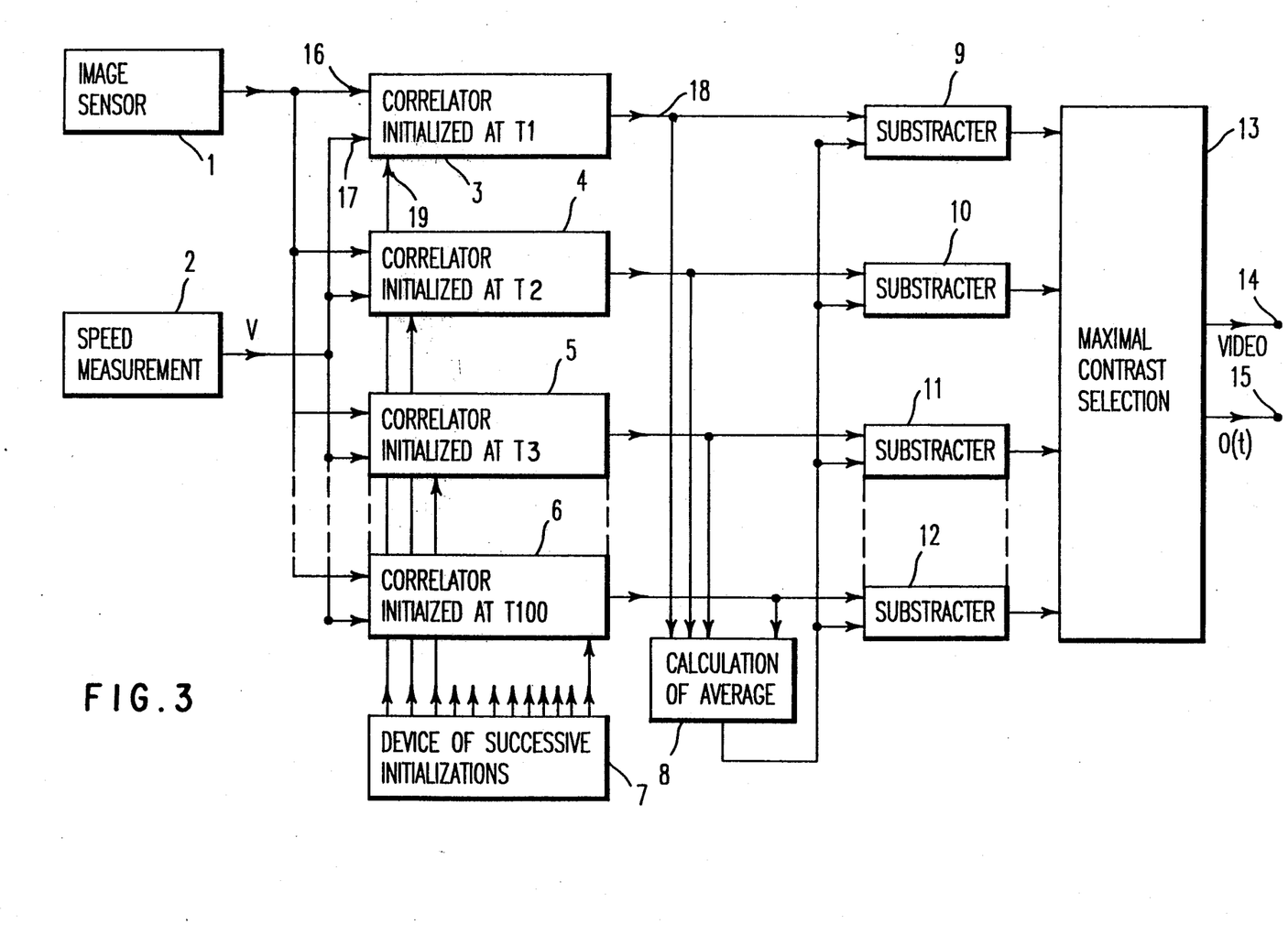
FIG. 3 is a block diagram of an example of an embodiment of a device for using the process according to the invention.

FIG. 3 is a block-diagram of an embodiment of a device for using the process according to the invention. It comprises: an image sensor 1; a device 2 for measuring the speed of the vehicle; a plurality of correlators 3 to 6; a device 7 for successive initialization; a device 8 for average calculation; a plurality of subtractors 9 to 12; a device 13 for selection of the maximal contrast; an output terminal 14 to provide a video signal; an output terminal 15 to provide an estimate of distance D(t).

Each correlator is associated with a substractor and corresponds to a different time law. For example, the number of correlators may be equal to 100. Each correlator is initialized at a different instant, respectively, T1, T2, T3 ... T100, but with an identical initial distance value, DI, equal to the maximal distance of visibility of an object. The hundred time laws providing the hypothetical values of distance are then the following:

$$D1(t) = DI - V(t - T1) \quad (4)$$
$$D2(t) = DI - V(t - T2)$$
$$\vdots$$
$$D100(t) = DI - V(t - T100)$$

These time laws give the same values as the time laws of form DO-V,t where the initial value of distance, DO, would be different for each law. The resolution of the measurement depends on the number of laws and the interval of time between the different instants of initialization of the correlators. The choice of value DI and the choice of instants T1 to T100 depends on the application envisaged and is within the scope of one skilled in the art. In general, the desired resolution for long distances is less important than the desired resolution for short distances. Consequently, the intervals between the instants of initialization T1 ... T100 are not chosen to be identical. On the other hand, the process is more sensitive to variations of distance when the distances are short than when the distances are long. Therefore, this is one more reason for choosing initialization instants making it possible for the object to have a better resolution for short distances.

Each correlator, such as correlator 3, has an input terminal 16 connected to the output of image sensor 1, an input terminal 17 connected to the output of speed measuring device 2, and an initialization input terminal 19 connected to an output of device 7; and has an output terminal 18 connected to an input of device 8 and to a first input of subtracter 9. Each subtractor 9 to 12 has a second input connected to the output of device 8, and an output connected, respectively, to an input of device 13. Two outputs of device 13 are connected respectively to output terminals 14 and 15.

Each correlator, such as correlator 3, receives at its input terminal 16, a series of digital values which are the luminance values of an image analyzed by image sensor 1; and receives, at its input terminal 17, a measurement of speed V provided by device 2. Each correlator provides, at its output terminal 18, a series of digital values which are integrated luminance values with each value corresponding to a pixel.

At a given instant, correlators 3 to 6 provided integrated luminance values corresponding to homologous pixels, i.e., having the same position in an image. Device 8 calculates an average value of the integrated luminance values provided by correlators 3 to 6 for an image. Subtracters 9 to 12 respectively calculate the difference between each integrated luminance value and the average value provided by the output of device 8. Each difference value reflects the contrast of a pixel of the integrated image, relative to the local average luminance of this integrated image.

The device constitutes a detector of high spatial frequencies which is free of noise, for the following reason: If the image of an object is sharp at the output of one of correlators 3 to 6, it is necessarily blurry at the output of the other correlators, and all the more so at the output of device 8 which calculates the average. The output of device 8 for calculating the average therefore provides a signal reflecting a very blurry average image, and free of noise because the average is calculated from a large number of integrated images (100). Subtraction of this average image from each of the integrated images corresponding to the output signals of the correlators therefore does not contribute any additional noise. Therefore it makes it possible to greatly attenuate the background low spatial frequencies without altering the high spatial frequencies, which correspond to the contours.

Device 13 compares the values of the differences provided by subtracters 9 to 12 for each pixel, and determines the greatest value. It provides, on output terminal 14, this greatest value; and, on output terminal 15 a binary word D(t) which is a distance value selected from the hundred possible values: D1(t) ... D100(t). The selected value is calculated at instant t, by device 13, according to one of formulas (4). The formula selected corresponds to the luminance difference having the greatest absolute value for the pixel considered.

The series of digital values of the luminance differences, provided by output terminal 15, can be applied to a display device to restore an image of the scene observed by image sensor 1. The structure of device 13 is not described in more detail because the embodiment of means to compare the values of the differences, to select one of them, and to calculate corresponding distance D(t), is within the scope of one skilled in the art.

Each of correlators 3 to 6 integrates with a leakage, in a memory called an integrated image memory, the luminance values of the images analyzed successively by sensor 1, and the luminance values of the predicted images. The luminance value of each pixel of a predicted image is determined as a function of the position of the pixel considered, in the predicted image considered, as a function of speed V of the vehicle, and as a function of the time that has elapsed starting from the instant of initialization of the correlator.

The initial position and initial size of the object in the first predicted image, i.e., just after the instant of initialization of the correlator, are constituted respectively by the position and size of the object in the image analyzed at this instant by the sensor. Then, for other predicted images, the position and size are deduced from the position and size of the image of the object as they are represented by the integrated image. Each predicted image therefore is a function both of the preceding predicted images and of the preceding analyzed images, but a leakage factor is provided for the weight of the oldest images to be reduced as time lapses.

In the predicted image, the data of the luminance representing each pixel is radially displaced relative to center o of the image which is confused with speed vector V of the vehicle. The luminance data of all the pixels located on a circle of given radius are displaced in an identical way, whether or not they represent an object. The displacement of the luminance data of a pixel consists in attributing this luminance value to one of the neighboring pixels. The discontinuous structure of the images leads to zigzag displacements making it possible to obtain an average path which is radial.

Figure 4:
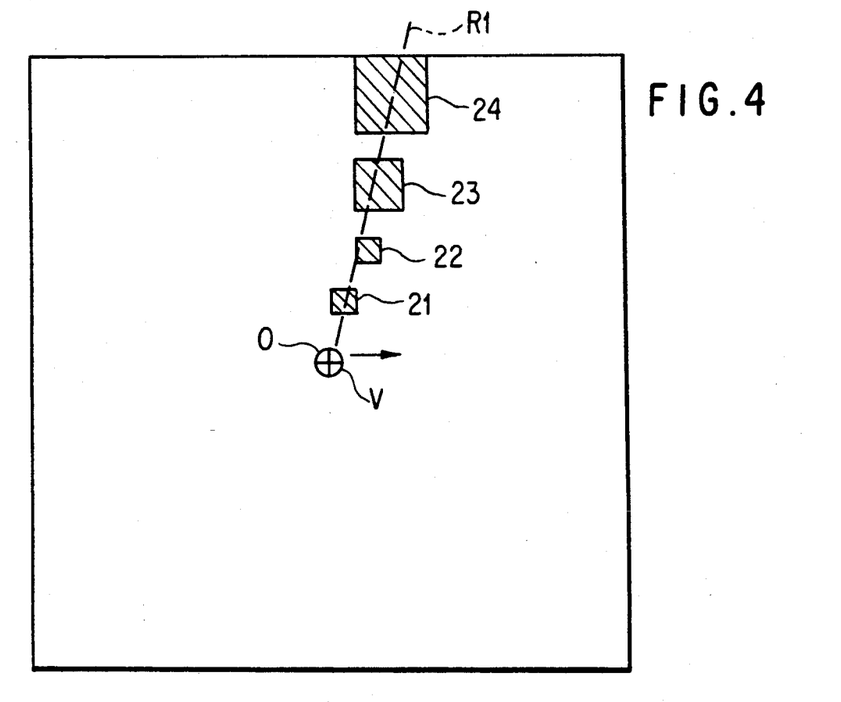
FIGS. 4 to 6 illustrate the functioning of the embodiment of FIG. 3.

FIG. 4 represents the displacement of an image of an object inside analyzed images. The image of the object is displaced over a radial half-line R1, in the direction of the edge of the image. The image of the object occupies a single pixel, 21, in the first analyzed image in which the object is perceived for the first time. Then, in a second analyzed image, it occupies a pixel 22, a little farther from the center than preceding pixel 21. Then, in a third image, it occupies a group 23 of four pixels. Then, in a fourth image, it occupies a group 24 of nine pixels. In proportion to the displacement of the image of the object, it increases in size by a homothetic transformation having a ratio proportional to distance r(t) between center of the image and the center of the image of the object. In this example, the image of the object has a square shape, but, of course, it can have a more complex shape with edges having a decreasing luminance.

The image is sampled in the form of square pixels which are superposed without offset from one line to the next. In other examples, the image could have a rectangular format or a different sampling structure.

The series of predicted images, when it is predicted according to a time law giving a distance value identical with the read Applicants, at each instant, coincides with the series of analyzed images, except for an approximation that is due to errors in sampling of the image and to the limited number of time laws used.

Figure 5:
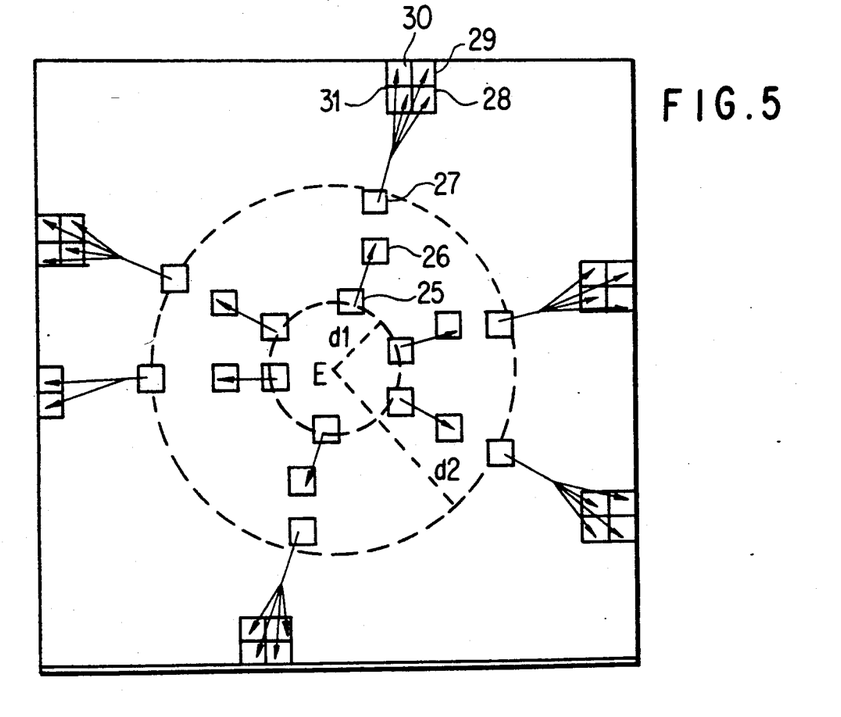

FIG. 5 illustrates the process used by each of correlators 3 to 6 to determine a predicted image from the integrated image. This figure represents diagrammatically the integrated image memory and the transfers of data inside it during addition of the predicted image to the integrated image. Addition of the analyzed image at the same instant is not represented in this figure. Each square represents a cell of the memory and corresponds to an image pixel. Determination of a predicted image, and its addition, consists in displacing the luminance values of the integrated image, along radial half-lines passing through center E of the image memory.

The latter, for example, has 512×512 cells distributed in the form of a square corresponding to 512×512 pixels of an image. The distances considered inside the memory and the distances considered inside the images are expressed in pixels. All the luminance values located in cells 25 which are located at a distance d1 from center E of the memory are displaced simultaneously and with a centrifugal speed, respectively toward other cells 26 farther from center E and located on the same circle. The luminance values located in cell 27 at distance d2 from center E are displaced toward cells 28 to 31 farther from center E, all with the same centrifugal speed. But, in this second case, the speed modulus is higher than in the first case since the image of the object is displaced faster when it is close to the edges of the image; and, further, each luminance value is transferred in several cells, 28 to 31, at the same time because the size of the image of the object increases in proportion a it is displaced towards the edges of the image.

As indicated in above-mentioned formula (2), the radial displacement speed from the center of the image of the object, is proportional to distance r(t) from center of the object to center o of the image and to modulus V of the speed of the vehicle; and is inversely proportional to distance D(t) between the vehicle and the object. Also, the radial displacement speed of the luminance values in the integrated image memory of each correlator should be proportional to distance d between center E of the image memory and the cell containing the luminance value to be displaced; also proportional to modulus V of the speed of the vehicle; and inversely proportional to the hypothetical distance, D1(t) or ... D100(t), which is given by the time law corresponding to the correlator considered.

Figure 6:
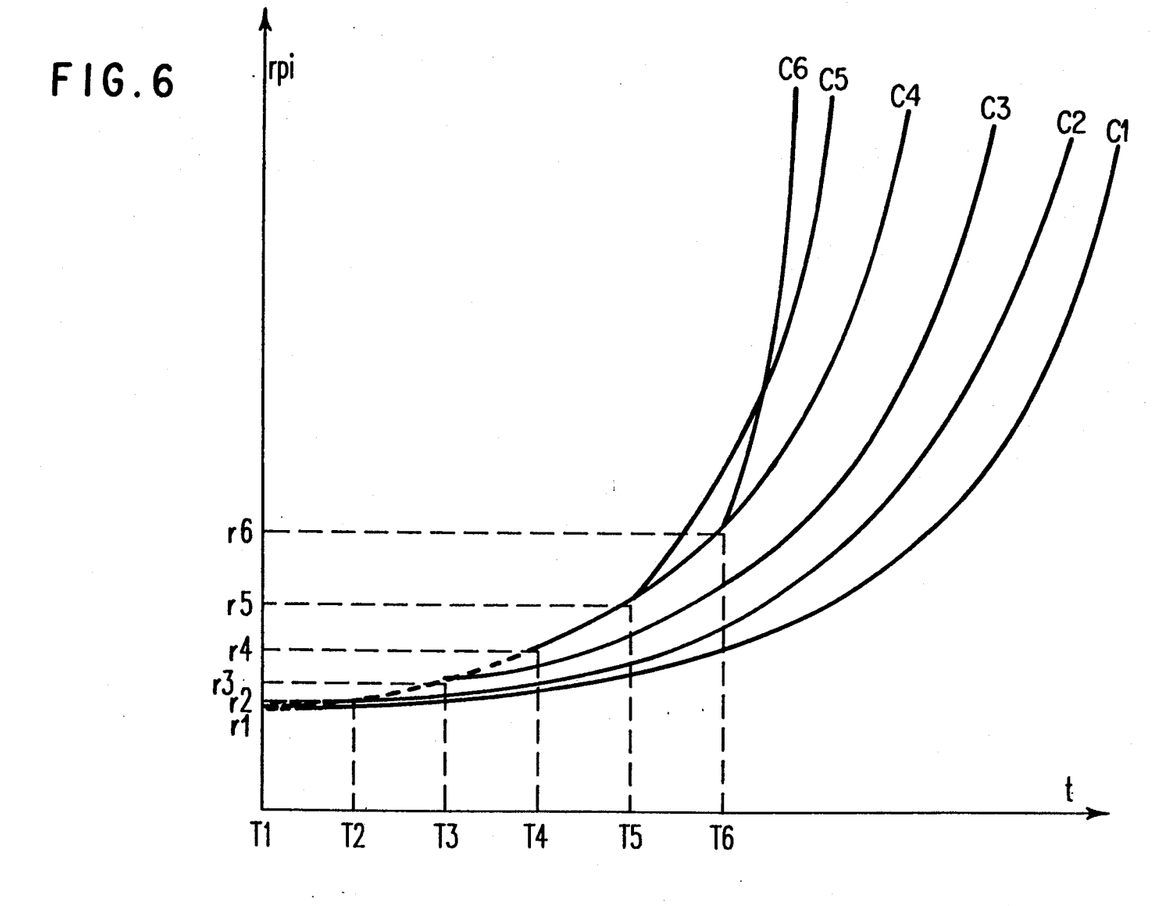

FIG. 6 illustrates the functioning of the plurality of correlators over time. It represents the graph of predicted distance rpi(t) between center E of the predicted image and the center of the image of the object in this predicted image, for correlators C1 ... C6. Distance rpi(t) predicted by first correlator C1 is deduced from formulas (1) and (4):

$$rpi(t) = \frac{R \cdot d0}{Di(t)} = \frac{R \cdot D0}{DI - V(t - Ti)} \quad (5)$$

At initial instant Ti predicted distance rpi(t) is equal to real distance r(Ti) between center o of the analyzed image and the center of the image of the object since the correlator is then initialized with an analyzed image:

$$rpi(Ti) = r(Ti) \quad (6)$$

Formula (1) makes it possible to express R.dO as a function of r(Ti):

$$r(Ti) = \frac{R \cdot d0}{DI} \quad (7)$$

therefore:

$$rpi(t) = \frac{dI \cdot r(Ti)}{DI - V(t - Ti)} \quad (8)$$

In this example, the number of correlators is limited to 6 for greater clarity. The correlators are initialized respectively at successive instants T1, T2 ... T6, with images provided by the sensor in which the center of the image of the object is located respectively at increasing distances r1, r2 ... r6, relative to center o of the image analyzed by the sensor.

A first correlator C1 is initialized at instant T1 with an image provided by the sensor where the center of the image of the object is at a distance r1 from the center of the analyzed image. This first correlator C1 determines a series of predicted images in which the center of the image of the object moves away from center E of the predicted image according to the graph carrying reference C1.

A second correlator, C2, is initialized at instant T2, later than T1, with an image provided by the sensor where the center of the image of the object is at a distance r2, greater than r1, relative to center o of the analyzed image. This second correlator determines a series of predicted images in which the center of the image of the object moves away from center E of the predicted image, according to the graph carrying the reference C2.

Also other correlators (C3 ... C6) each determine a series of predicted images in which center E of the predicted image is displaced respectively according to the graphs carrying reference C3 ... C6.

In this example, the fourth correlator, C4, has a time law which corresponds exactly to the law of variation of the real distance between the vehicle and the object. Consequently, curve C4 passes exactly through the points: (r4, T4), (r5, T5), (r6, T6). If these graphs are considered at a given instant, they each have a different slope. Consequently, an integration of the luminance of the analyzed images and of the predicted images during a period close to this given instant does not give the same integrated value. This difference between integrated values corresponds to a blurriness around the image of the object, in the integrated images in the correlators other than correlator C4.

In practice, each correlator ignores the existence of an object visible in the images. It does not simply process the center of an object but processes each pixel of the integrated image.

Determination of a predicted image such as the center of the image of the object is displaced according to formula (8), and the size of this image increases proportionally to rpi(t) is accomplished, for each pixel of the integrated image, by a reading operation in the first cell, followed by a writing operation in at least one second cell of the integrated image memory. The value entered in the second cell is the sum of the luminance value of the pixel of the analyzed image, corresponding to this second cell, and a predicted luminance value, which quite simply consists of the integrated luminance value read in the first cell, after having multiplied the latter by a factor k, between 0 and 1 to assure an integration with leakage.

Determination of the predicted value consists therefore essentially in determining where the first cell is located, knowing that the luminance values in the predicted image of the first correlator are displaced according to formula (8). A differentiation of this formula shows that an elementary radial displacement, d[rpi(t)], of a first cell to a second cell should have a modulus proportional to distance r(Ti) between center E of integrated image memory and the first cell; proportional to modulus V of the speed of the vehicle; proportional to period dt of the displacement, and proportional to the distance of initialization of all correlators: DI.

$$d[rpi(t)] = DI \times V \times r(Ti) \times dt \quad (9)$$

In practice, the determination of each predicted luminance value is performed for radical elementary displacements of fixed length and equal to one pixel. Therefore, the first cell is always connected to a second cell. Since the modulus of the elementary displacement is imposed, its period is then variable as a function of the initial position of the first cell, defined by r(Ti), and as a function of the speed of the vehicle. The luminance data will "jump" from one cell to another related cell at a rate which increases as the data moves away from the center E of the integrated image memory. In the following description, each operation of reading an integrated luminance value, in a first cell, and writing of a new luminance value in a second cell, which is related to it, is called "read-write-operation" and its rate is called "speed."

Figure 7:
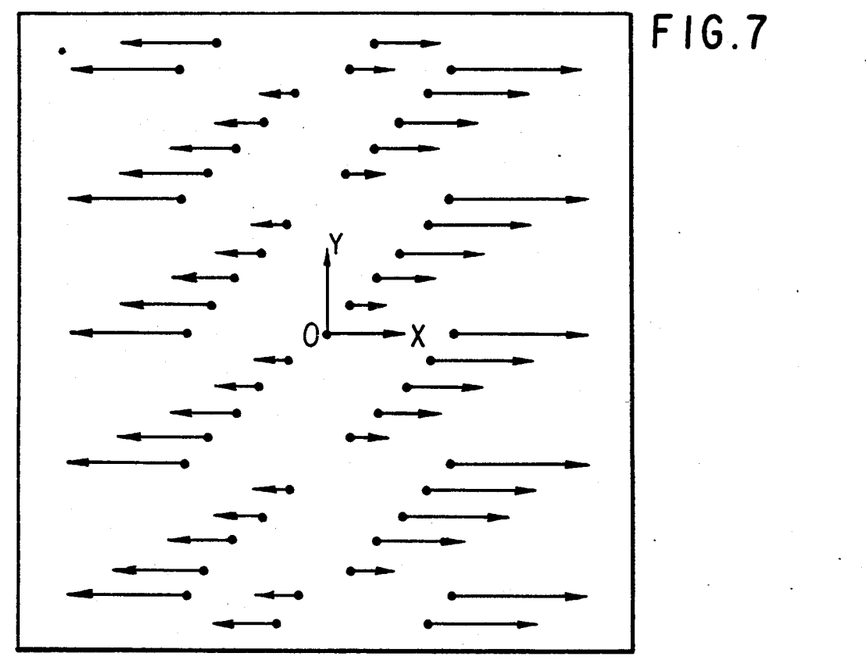
FIGS. 7 to 9 represent diagrammatically the functioning of a part of the FIG. 3 embodiment.
Figure 8:
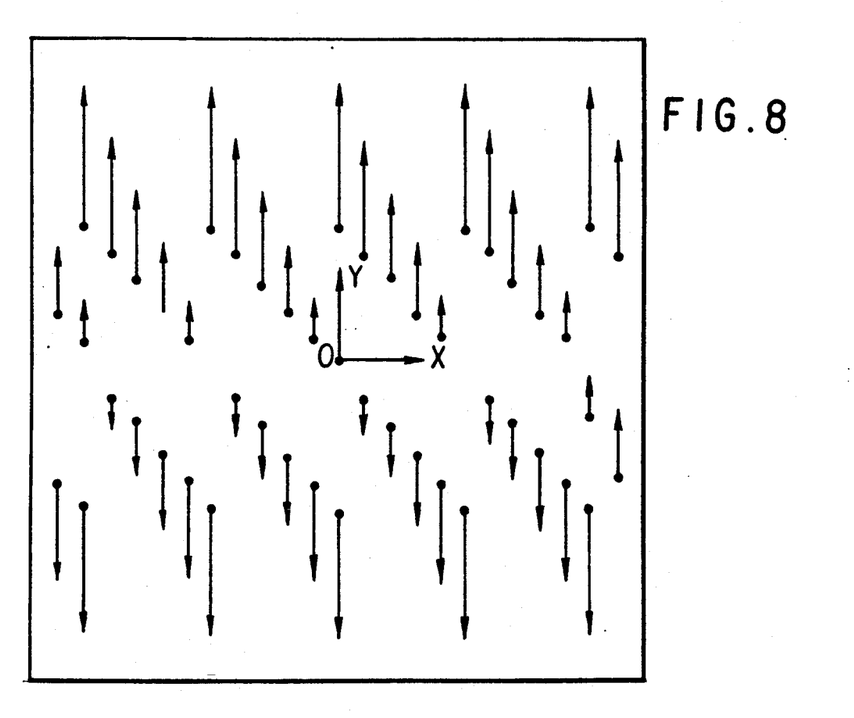
Figure 9:
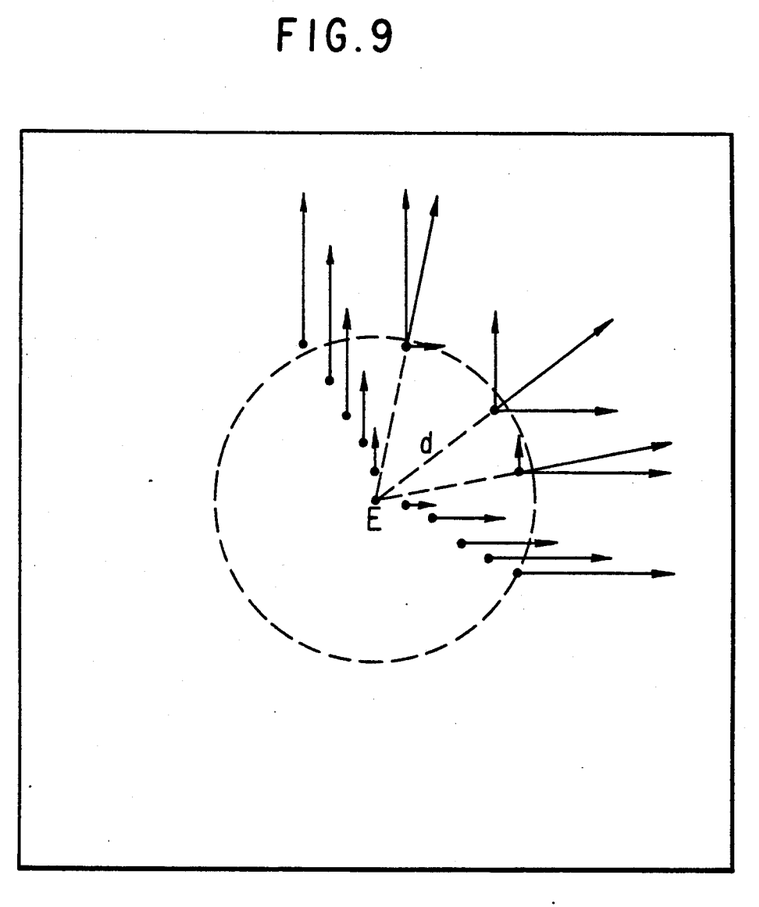

FIGS. 7, 8 and 9 illustrate the process used to achieve the read-write operations in the integrated image memory of each correlator, at a speed proportional to the distance between the cell and center E of the memory, and constant for a given distance, regardless of the orientation of the radial displacement. In the memory, each cell is marked by coordinates x and y in a point of reference oxy which is centered at center E of the memory. The process consists in combining speed fields represented respectively in FIGS. 7 and 8 to obtain the desired speed field.

The first speed field consists of vectors which are all parallel to axis Ox and whose modulus is proportional to the absolute value of x and to modulus V of the speed of the vehicle. The second speed field comprises vectors all parallel to axis Oy and having a modulus proportional to the absolute value of y, and to modulus V of the speed of the vehicle. The proportionality factors are the same for both speed fields. Consequently, for all cells having coordinates (x,y) such as $x^2+y^2$=constant, the modulus of the speed vector is constant. The speed field resulting from the superposition of these two orthogonal fields therefore is such that, for all cells located at a distance d from the center of the integration memory, the resulting speed vector is radial and has a constant modulus.

FIG. 9 shows the geometric determination of the resulting speed vector of these two fields for three cells of the integration memory, all three located at a distance d from center E of the integration memory.

In practice, achievement of these two orthogonal speed fields consist in performing readings-writings, respectively, from one column to the next and from one line to the next. The rate of the operations is proportional to the absolute value of the abscissa of the column, or to the absolute value of the ordinate of the line. The luminance values contained in the lines farthest from center E are read and written faster than those located close to center E. Consequently, there appear lines of empty cells which are to be filled by writing luminance values identical with those written in a neighboring column, which comes down to splitting this neighboring column.

The following table indicates the number of clock steps between reading in one cell and writing a related cell, and gives the number of clock steps between two doublings of a pixel of abscissa x.

| Pixel of abscissa | Number of clock steps between the reading in the cell of abscissa x and the writing in the cell x + 1 | Number of block steps between 2 doublings of a pixel of abscissa x | |
|---|---|---|---|
| x = 128 | Erasing | | Nothing |
| 127 | 129 | 128 × 128 = | 16 512 |
| 126 | 130 | 130 × 128 = | 16 770 |
| 125 | 131 | 131 × 130 = | 17 030 |
| 124 | 132 | | 17 292 |
| 123 | 133 | | 17 556 |
| 122 | 134 | | 17 882 |
| 121 | 135 | | 18 090 |
| 120 | 137 | 137 × 135 = | 18 415 |
| 119 | 138 | | 18 906 |
| 91 | 180 | | 31 040 |
| 90 | 182 | 182 × 180 = | 32 760 |
| 89 | 184 | | 33 481 |
| 51 | 321 | | 100 794 |
| 50 | 328 | 328 × 321 = | 105 288 |
| 49 | 334 | | 109 552 |
| 31 | 528 | | 270 336 |
| 30 | 546 | 546 × 528 = | 288 288 |
| 28 | 565 | | 398 490 |
| 21 | 780 | | 580 887 |
| 20 | 819 | 819 × 780 = | 638 820 |
| 19 | 862 | | 705 978 |
| 11 | 1489 | | 2 032 981 |
| 10 | 1638 | | 2 438 982 |
| 9 | 1820 | | 2 981 160 |
| 3 | 5461 | | 22 368 256 |
| 2 | 8192 | | 44 736 512 |
| 1 | 16384 | | 134 217 000 |

Figure 10:
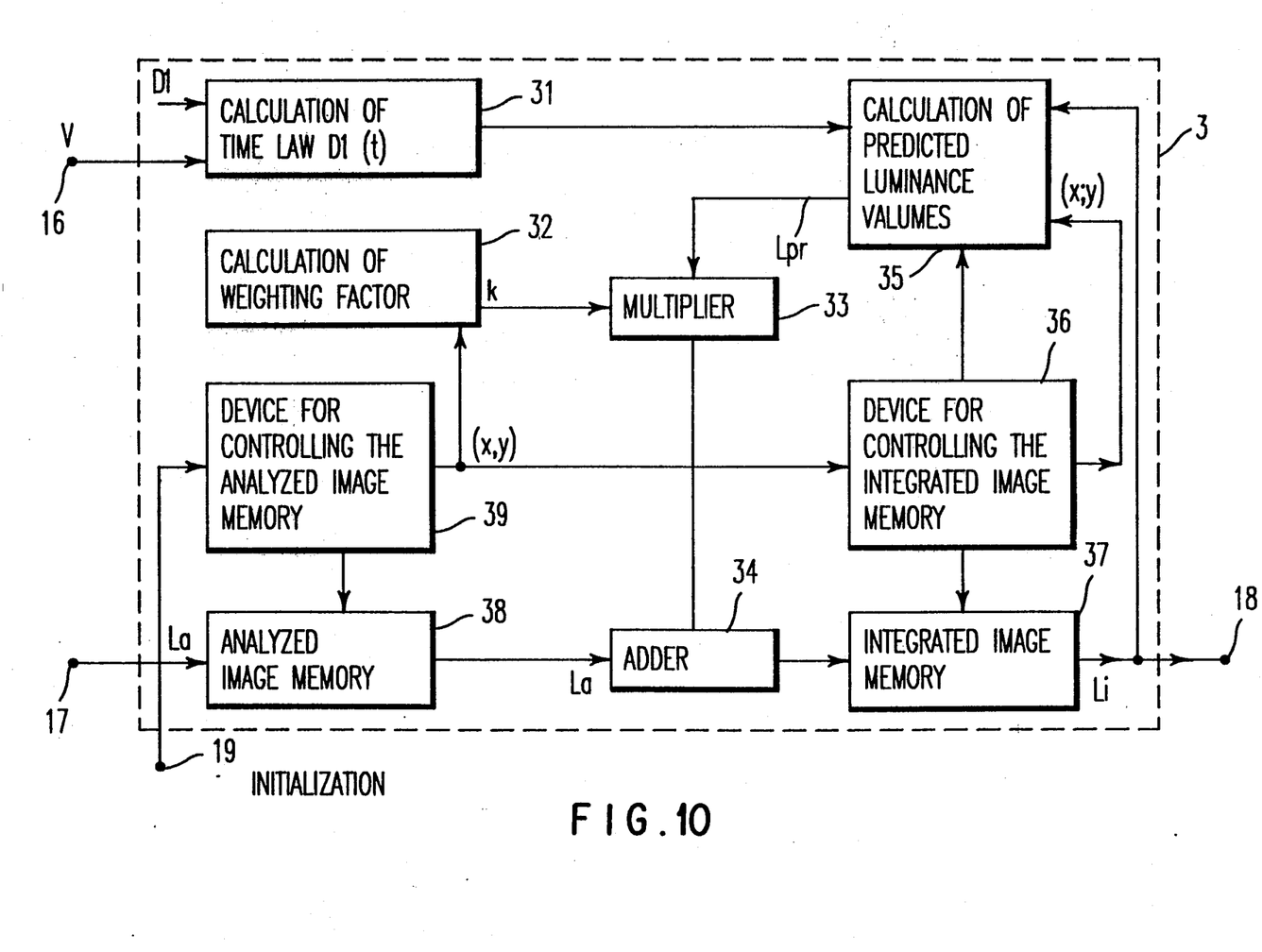
FIG. 10 is a detailed block diagram of a portion of the FIG. 3 embodiment.

FIG. 10 represents the block diagram of an example of embodiment of a correlator such as correlator 3 represented in FIG. 3. This embodiment comprises: a device 31 for calculating time law D1(t); a device 32 for calculating the weighting factor; a multiplier 33; an adder 34; a device 35 for calculating predicted luminance values; a device 36 for controlling the integrated image memory; an integrated memory memory 37; an analyzed image memory 38; and a device 39 for controlling the analyzed image memory.

Device 31 has: an input receiving the initial value of distance DI which is a constant, an input connected to input terminal 16 receiving value V of the modulus of the speed of the vehicle; and an output connected to a first input of device 35. Device 31 provides on this output a clock signal which has a rate proportional to the logarithmic derivative of distance D1(t) calculated according to the first time law, according to formula (4). Device 35 has a second input connected to an output of memory 37, a third input connected to an output of device 36, and an output connected to a first input of multiplier 33.

Device 35 has the function of calculating the predicted luminance values, Lpr, from the integrated luminance values, L1, which are read in memory 37 under the control of device 36. The third input of device 35 receives the value of coordinates (x',y') of the cell in which there is read integrated luminance value Li which is received by a second input of device 35. Device 35 calculates the predicted luminance values, at the rate defined by device 31 for the predicted image to evolve as a function of distance D1(t).

A second input of multiplier 33 is connected to an output of device 32 which provides a value of weighting factor k. The output of multiplier 33 is connected to a first input of adder 34 in order to provide to adder 34 a predicted luminance value which is weighted by factor k, the latter being a function of coordinates (x,y) of the cell in which a writing will be performed at the instant considered. This weighting factor is greater for pixels located close to the center of the image than for pixels located close to the edge. A longer integration is necessary for luminance value close to the center of the image, because their displacements are slower than on the edges.

Coordinates (x,y) of the cell where the new integrated luminance value will be written are provided at an input of device 32 and at an input of device 36 by an output of device 39 for controlling the analyzed image memory. An input of device 39 is connected to input terminal 19 to receive the initialization signal. An output of device 39 is connected to an input for controlling the analyzed image memory, 38, to control the writing of luminance values La which are analyzed by the image sensor and to control the reading of these luminance values.

The analyzed image is assumed centered on the speed vector of the vehicle, by an image resetting device, of known type, and not represented in the figures.

Memory 38 has a data input connected to input terminal 37 to receive analyzed luminance values La. It has a data output connected to a second input of adder 34 in order to provide to the adder 34 the analyzed luminance values. An output of adder 34 is connected to a data input of integration memory 37 to provide to it the sum of an analyzed luminance value and a predicted and weighted luminance value. Memory 37 has a control input connected to an output of device 36 to receive read and write control signals. The data output of memory 37 is also connected to output terminal 18 to provide each integrated luminance value Li.

Device 35 for calculating predicted luminance values uses the process described relative to FIGS. 7 to 9. When there is no doubling of the pixel, device 35 transmits, without modification, the integrated luminance value read in cell (x,y) of memory 37, for calculating and writing a new integrated luminance value, in related cell (x,y+1). Subsequently, device 35 transmits a luminance value read in the same cell (x,y), to calculate and write a new integrated luminance value, in related cell (x+1,y). As explained above, these two operations are independent because the rate of the read-write operations in direction ox depends on x, while the rate of the read-write operations in direction oy depends on y.

When the doubling of a pixel is necessary, device (35) transmits twice the integrated luminance value read in cell (x,y) to calculate and write a new integrated luminance value, in related cells (x,y+1) and (x,y+2). Subsequently, device 35 transmits twice the luminance value read in the same cell (x,y) to calculate and write a new integrated luminance value, in related cells (x+1,y) and (x+2,y).

These operations are controlled by device 36, as a function of value V of the modulus of the speed of the vehicle and as a function of coordinates (x',y') of the cell where a new integrated luminance value is to be calculated and written, according to the abovementioned table.

The invention is applicable particularly to a ground following device to evaluate constantly the distance between an aircraft and obstacles located on the ground.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for estimating the distance between a stationary object and moving vehicle according to a given speed vector, comprising the steps of:

mounting an image sensor on said vehicle and analyzing images of said object received by said image sensors;

centering said analyzed images relative to the speed vector of said vehicle;

integrating, in a plurality of image memories, wherein said image memories correspond respectively to a plurality of predetermined values for distance, the luminance values of pixels of images which are analyzed successively by said sensor, and the luminance values of pixels of a series of predicted images to provide integrated luminance values for pixels of each of said image memories, wherein the luminance values of each pixel of one of said predicted images is determined, as a function of the integrated luminance value for a considered pixel and, as a function of the speed of the vehicle, as a function of the position of said considered pixel in said one predicted image, and as a function of the predetermined distance value of a corresponding image memory considered, in such a way that said one predicted image is generally affected by an enlargement increasing as a function of time; and searching, among a plurality of contrasts exhibited by the integrated luminance values of plurality of memories for the one of said memories wherein the integrated luminance values exhibit the greatest contrast corresponding to a sharply focused image of the object, and deducing from said one memory as estimate of distance.

2. The process according to claim 1, wherein the luminance values of a series of predicted images corresponding to a given distance is calculated at a different initial instant for each of said memories.

3. The process according to claim 1, wherein, in order to provide and estimate of distance, the method further comprises searching, among said plurality of memories, for two memories for the integrated luminance values which exhibit the two greatest contrast values and in subsequently linearly interpolating between said greatest contrast values corresponding to said two memories.

4. The process according to claim 1, wherein the step of determining the luminance values of the predicted images consist of reading integrated luminance values and writing the new integrated luminance values in an image memory, by jumping from a line to the next line, with a frequency proportional to the distance between the line and the geometrical center of said image memory and by jumping from a column to the next column, with a frequency proportional to the distance between the column and the center of a corresponding memory wherein the step further includes weighing the integrated luminance values which are read, by giving greater weight to those of the pixels closer to the geometrical center of the image.

5. An apparatus for estimating the distance between a stationary object and a moving vehicle, comprising:
means mounted on a vehicle to analyze images of said object and to center the images relative to a speed vector of said vehicle;
means for integrating, in a plurality of image memories corresponding respectively to a plurality of values for said distance, the luminance values of pixels of images analyzed successively, and the luminance values of pixels in a series of predicted images to provide integrated luminance values for pixels of each of said image memories, the luminance value of each pixels of said predicted image being determined as a function of the integrated luminance value for a pixel considered, as a function of the speed of the vehicle, as a function of the position of said considered pixel in one of said predicted images, and as a function of the predetermined distance value of a corresponding memory being considered; and
means for searching, among a plurality of contrast exhibited by the integrated luminance values of a plurality of memories, for the one of the said memories wherein the integrated luminance values exhibit the greatest contrast corresponding to a sharply focused image of the object and means for deducing an estimate of the distance from said one of said memories where the integrated luminance values exhibit the greatest contrast corresponding to a sharply focused image of the object.

* * * * *